United States Patent [19]

Weaver

[11] Patent Number: 5,160,481
[45] Date of Patent: Nov. 3, 1992

[54] OZONE GENERATION APPARATUS

[76] Inventor: William C. Weaver, 1714 Woodvalley Dr., Carmel, Ind. 46032

[21] Appl. No.: 721,988

[22] Filed: Jun. 27, 1991

[51] Int. Cl.$^5$ ............................................. B01J 19/08
[52] U.S. Cl. ........................... 422/186.07; 422/186.21
[58] Field of Search ............. 422/186, 186.04, 186.07, 422/186.1, 186.21, 186.27, 186.28, 5

[56] References Cited

U.S. PATENT DOCUMENTS

| | | | |
|---|---|---|---|
| 1,971,513 | 8/1934 | Stoddard | 422/186.1 |
| 2,140,618 | 12/1938 | Conley | 422/186.21 |
| 3,215,616 | 11/1965 | Spielman | 422/186.07 |
| 3,309,304 | 3/1967 | Caplan | 422/186 |
| 3,344,061 | 9/1967 | Kellum | 422/186 |
| 3,457,160 | 7/1969 | Fortier | 422/186 |
| 3,745,750 | 7/1973 | Arff | 55/102 |
| 3,899,682 | 8/1975 | Lowther | 250/532 |

Primary Examiner—Brooks H. Hunt
Assistant Examiner—Daniel J. Jenkins
Attorney, Agent, or Firm—Locke Reynolds

[57] ABSTRACT

Ozone generating apparatus adapted for quick installation into existing structures includes a plurality of housings adapted to be coupled together in at least two different relative orientations to permit adaptation of the ozone generation apparatus to the relative direction of air flow through an air handling conduit, with the housing containing ozone generating plates projecting rearwardly from the back surface of the housing containing the power and control circuitry for projection through an opening in the air handling conduit to a position wholly within the air handling conduit. The apparatus also includes ozone generating and air moving elements enclosed within a generally rectilinear housing having a closed top, four side walls depending from the top and terminating in a coplanar lower edge defining an open bottom, the lower edge being sized to be supported upon rails forming a grid work of a conventional suspended ceiling.

16 Claims, 4 Drawing Sheets

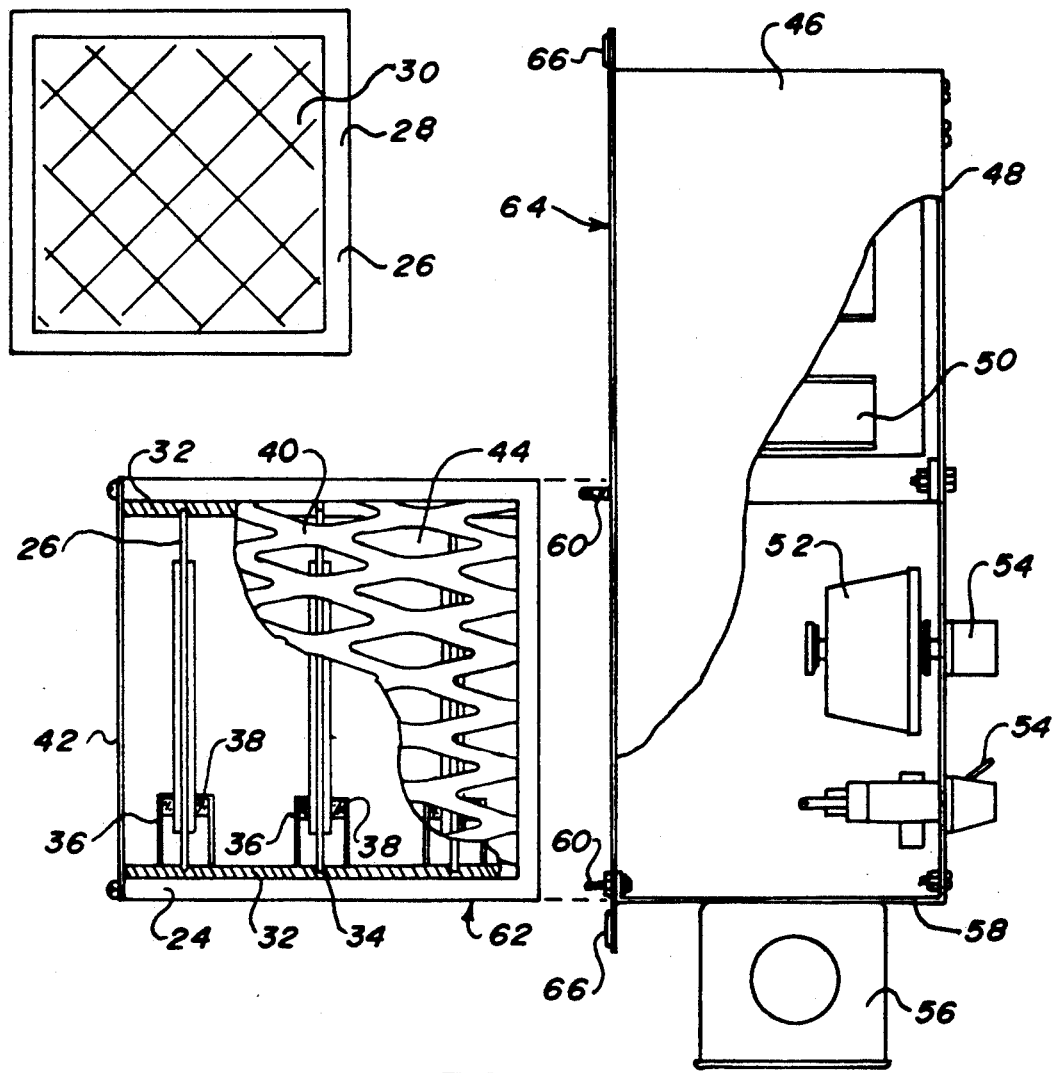

OZONE GENERATION APPARATUS

BACKGROUND OF THE INVENTION

This invention relates to ozone generators, particularly of the type intended to reduce offensive odors in air recirculated within a building or other enclosed structure.

For a significant fraction of the year, for most enclosed structures such as houses, office buildings, and the like, it is necessary to either heat or cool the air so as to provide a comfortable living temperature. Particularly in modern office buildings, where the windows cannot be opened, the only supply of fresh air is through a central air handling system. This central handling air system typically includes appropriate means for recirculating a portion of the building air while at the same time expelling another portion of the building air and replenishing it with fresh make-up air from outside the building. In the absence of any make-up air, the recirculated air quickly becomes stale and accumulates generally offensive odors. On the other hand, the use large amounts of make-up air increases the amount of energy required to either heat or cool that make-up air to the desired building temperature.

Many attempts have been made to remove offensive odors and to otherwise make the recirculated air within a building more acceptable. Liquids, sprays, and sublimating solids have been employed to introduce odor masking agents into the air. Filters have also been employed including chemically active agents such as activated carbon, potassium permanganate impregnated alumina, and the like.

Particular success has been achieved in eliminating offensive odors from enclosed spaces through the use of ozone generators which act to oxidize the unpleasant odors in the air while providing the air with a generally fresh spring-like scent. In general, the ozone generators have taken two forms. In a first form, ozone generation elements have been included in the original construction of certain air handling systems. An example of such a system is found in U.S. Pat. No. 4,343,765. A second type of unit comprises a portable unit easily transportable from room-to-room such as that sold by Ozonator Corporation of Athens, Ontario, Canada. While each of these apparatus may perform their intended function, there remains a need for units easily adapted to existing structures for quick installation into existing air handling systems. There also remains a need for otherwise unobstrusive units for use in individual rooms of office buildings and the like.

SUMMARY OF THE INVENTION

Ozone generating apparatus in accordance with the present invention are adapted for quick installation into existing structures through the design of housing units for the ozone generating equipment which housing units are designed for integral incorporation into standard elements of existing structures. In a first embodiment, a plurality of housings are adapted to be coupled together in at least two different relative orientations to permit adaptation of the ozone generation apparatus to the relative direction of air flow through an existing air handling conduit. A first housing containing ozone generating plates projects rearwardly from the back surface of a second housing containing the power and control circuitry. The second housing includes a flange adapted to sealingly engage the outer surface of the air handling conduit while the first housing projects through an opening in the air handling conduit to a position wholly therewithin.

A second embodiment of the apparatus includes ozone generating and air moving elements enclosed within a generally rectilinear housing having a closed top and four side walls depending from the top terminating in a co-planar lower edge defining an open bottom, the lower edge being sized to be supported upon rails forming a gridwork of a convention suspended ceiling. Both embodiments are intended to be quickly installed in existing structures and, when installed, to cooperate with the operation of the existing structures so as to facilitate the treatment of air within that structure.

Both embodiments employ a separate housing containing a plurality of ozone generating plates which housing is separate from that containing the electronic circuitry and control means, the housing containing the ozone generating plates being preferentially positionable within the path of a circulation of air. These structures, in accordance with the present invention, have the advantage of quick installation. Yet when installed can cooperate with other elements of air treatment apparatus to produce an appropriate level of air refreshing ozone in the recirculated air within the building environment.

The various features and advantages of the present invention will become apparent to those skilled in the art upon consideration of the following description of preferred embodiments exemplifying the best mode of carrying out the invention as presently perceived. The detailed description particularly refers to the accompanying drawings.

BRIEF DESCRIPTION OF THE DRAWINGS

FIG. 4 is a side elevational view of the apparatus shown in FIG. 1 with the first housing rotated by 90° with respect to the second housing.

FIG. 5 is a front elevational view of an ozone generating plate employed in the present invention.

DESCRIPTION OF PREFERRED EMBODIMENTS

Figure 1:
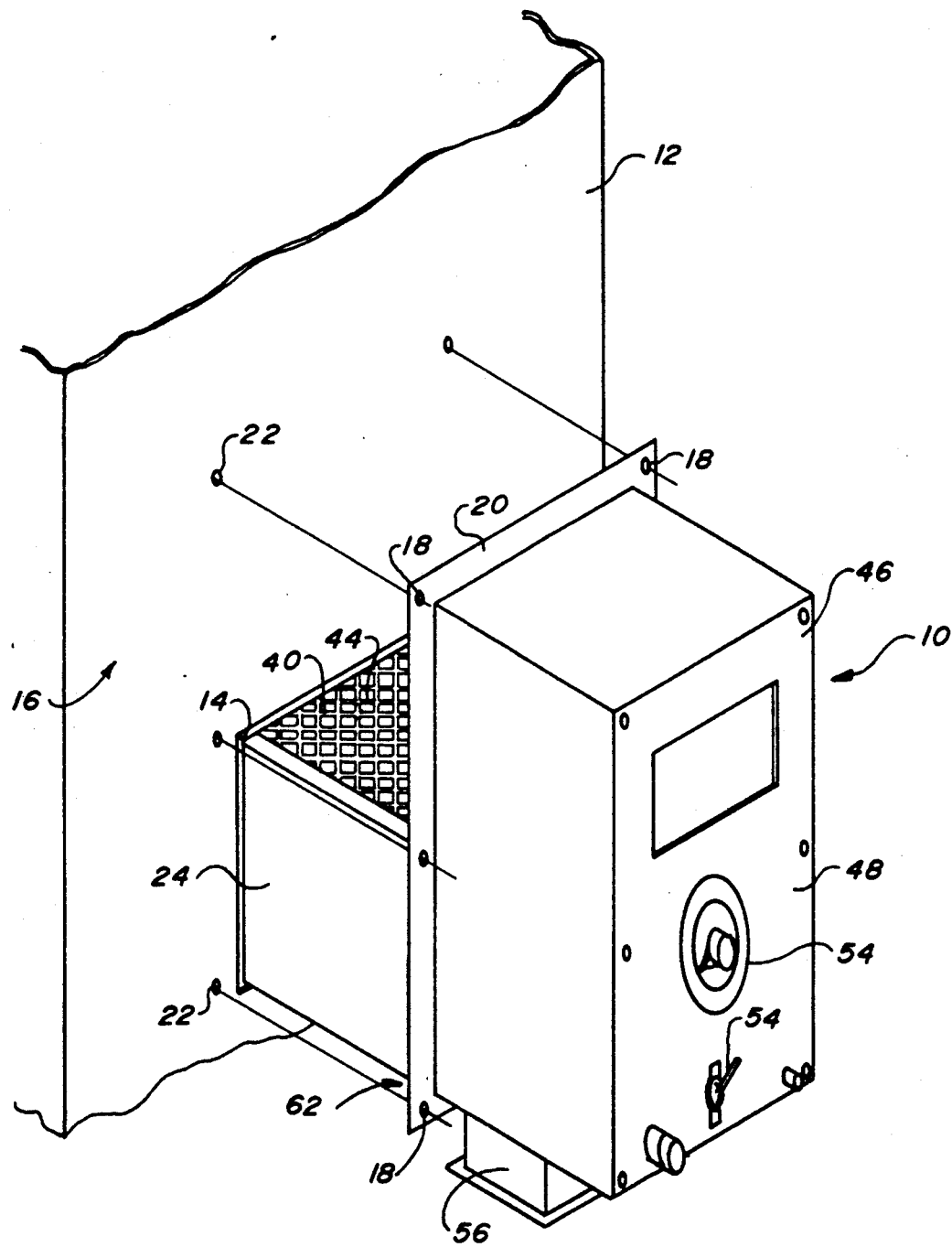
FIG. 1 is a perspective view showing a first embodiment of the present invention situated in front of an air handling conduit into which it is to be installed.

A first ozone generating apparatus 10 in accordance with the present invention is shown in FIG. 1 situated in front of an air handling duct 12 of a central air handling system. The duct 12 includes an opening 14 cut in Panel 16 of duct 12 to permit the installation of the ozone generating apparatus 10. A plurality of fasteners, not shown, secure the ozone generating apparatus to the duct 12 by passing through holes 18 of flange 20 and through holes 22 in duct 12.

The ozone generating apparatus includes a first housing 24 containing a plurality of ozone generating Plates 26 more clearly shown in FIGS. 4 and 5. The ozone generating plates 26 comprise a generally rectilinear ceramic substrate 28. A metallic ozone emitter 30 is bonded to opposite sides of the ceramic substrate 28 to provide a wide area emitter of ozone when an appropriate potential is applied to the metallic emitter grid 30. The ozone generating plates 26 are supported within housing 24 by a pair of ozone resistant PVC elements 32 including slots 34 adapted to receive an edge of the ceramic substrate 28. Electrical contacts 36 and 38 are provided which contact the grids on opposite surfaces of the ceramic substrate 28.

The housing 24 includes a pair of opposed porous walls 40 which are shown to be constructed of a single U-shaped strip of expanded metal which forms the backwall 42 as well as the opposed pairs of walls 40. The walls 40 include openings 44 which allow air to flow through the first housing 24 and adjacent to the plurality of ozone generating plates 26.

A second housing 46 is provided for containing the circuit means for developing the electrical potential necessary for application to the ozone generating plates 26. The circuitry includes means 50 such as a transformer for developing the potential required for ozone generation and control means 52 including switches, rheostats, and the like, for controlling the level of potential and the period of potential development to be delivered to the plates. Appropriate manipulative controls 54 project outward through the front surface 48 of the second housing 46 for manipulation in response to changing demands for ozone. A third housing 56 is provided on a lower panel 58 of second housing 46 which contains means for connecting the circuitry within housing 46 to an outside source of power.

Figure 2:
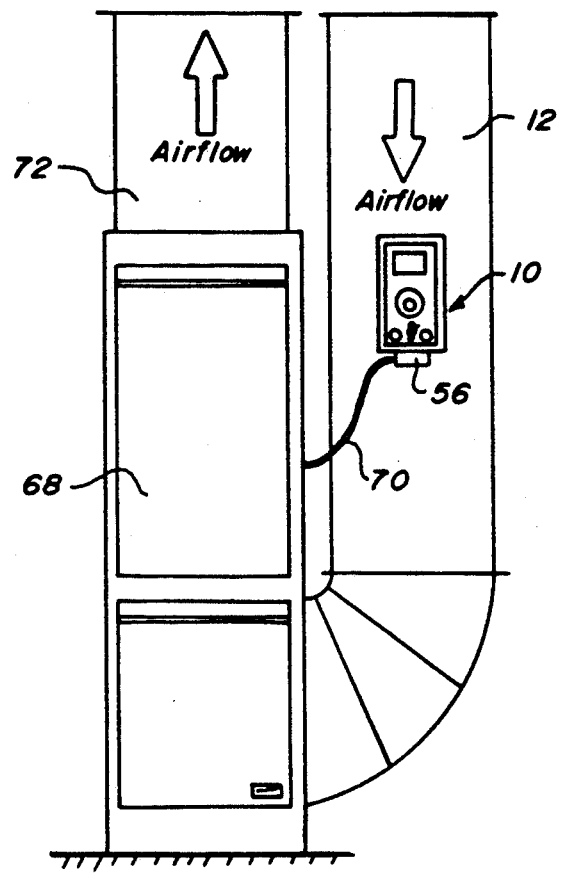
FIG. 2 is a schematic view of the installation shown in FIG. 1.
Figure 3:
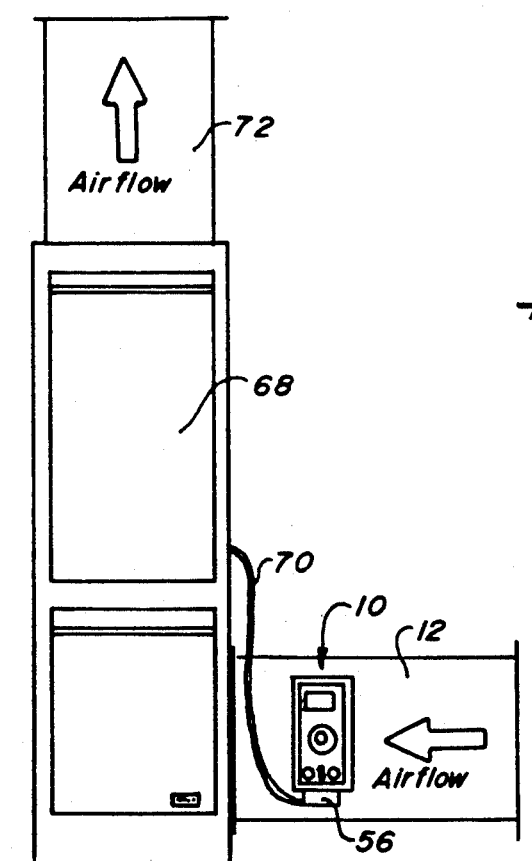
FIG. 3 is a schematic view of an alternative installation.

The first housing and second housing are selectively positionable with respect to each other in the manner illustrated in FIGS. 1 and 4 so as to adapt the unit for either vertical or horizontal air flow through the air handling conduit 12. Where the air flow is substantially vertically as shown in FIG. 2, the first housing 24 is oriented such that porous walls 40 form an upper and lower surface to housing 24 as shown in FIG. 1. Where the airflow through the air handling conduit is substantially horizontal as shown in FIG. 3, the first housing 24 is rotated to the Position shown in FIG. 4 prior to attachment to the second housing 46. Appropriate fastening means 60 allow the first housing 24 to be fastened to the second housing 46 in either orientation.

In both orientations, the housing 24 is vertically offset with respect to housing 46 so that when the apparatus 10 is installed into the conduit 12, a torque will be developed around a lower front edge 62 of the first housing causing the back surface 64 of housing 46 including ceiling means 66 to be biased into engagement with surface 16 of conduit 12.

As shown in both FIGS. 2 and 3, the apparatus 10 is installed in the return air handling conduit coupled to a lower portion of an air treatment apparatus such as a household furnace or HVAC unit 68. A power cord 70 brings power from the operating system of the HVAC unit 68 to the third housing 56 to supply power to the unit 10. In use, air flowing through the return air duct is subjected to the addition of ozone from the ozone generating plates and then either heated or cooled by the HVAC unit 68 whereupon the air is expelled through outlet air handling conduit 72. The ease of installation is provided by the quick facility with which the first and second housings can be oriented, one with respect to another, prior to the introduction of the first housing into an opening 14 conveniently cut in a return air duct 12 of such an HVAC system.

Figure 6:
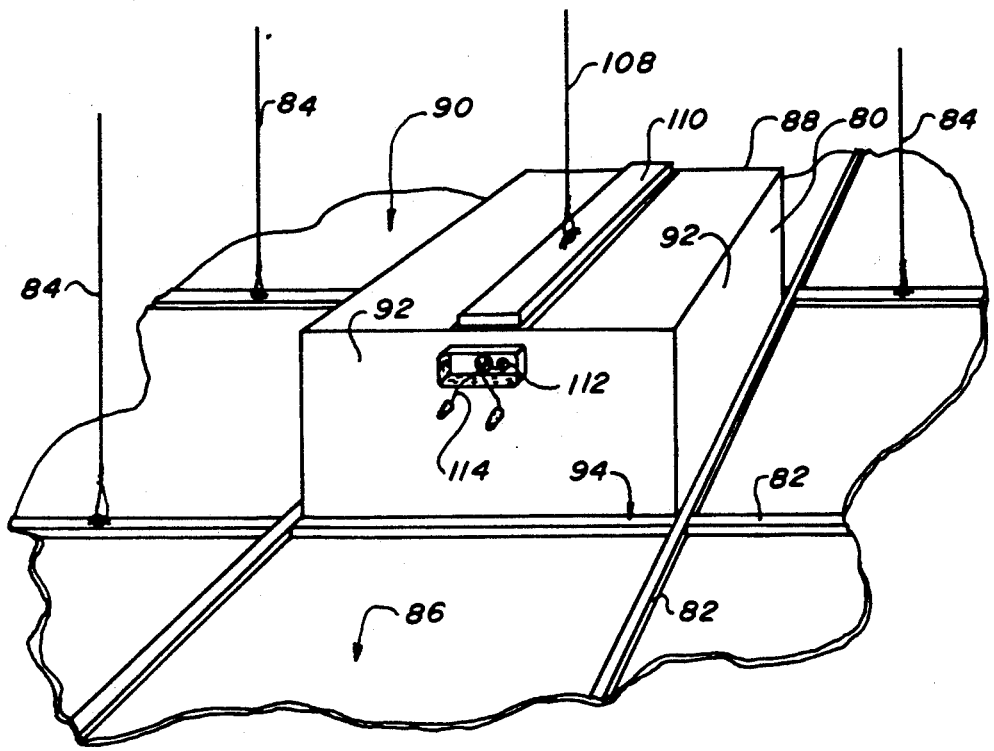
FIG. 6 is a perspective view of the second embodiment of the present invention installed in the gridwork of a suspended ceiling.
Figure 7:
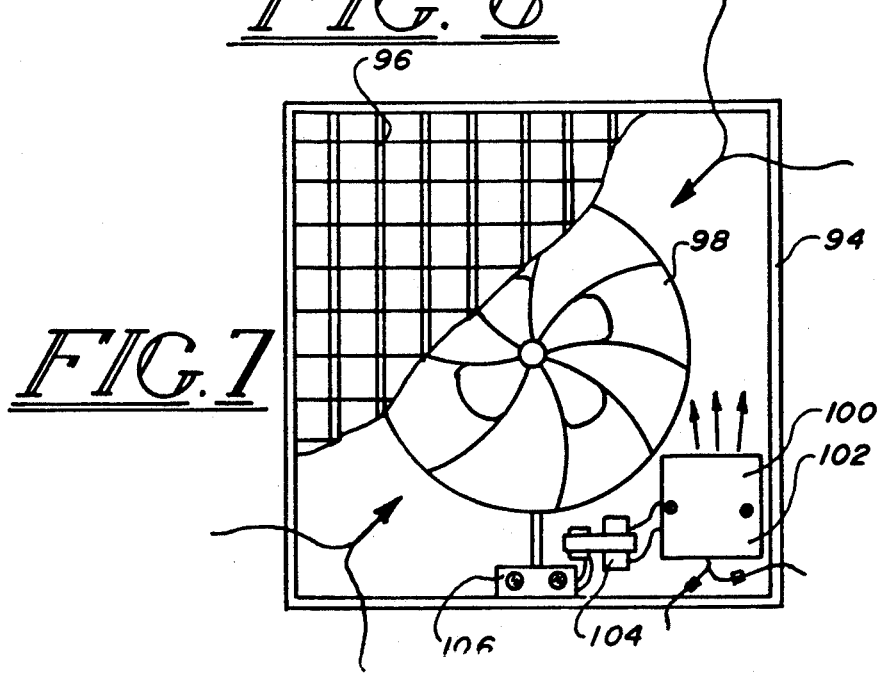
FIG. 7 is a bottom plan view of the embodiment shown in FIG. 6 with the porous lower panel partially broken away.

A second embodiment of the present invention is shown in FIGS. 6 and 7 and comprises an apparatus 80 especially adapted for installation into a suspended ceiling system of a building. Conventionally, such suspended ceiling systems comprise a plurality of generally inverted T-shaped members 82 arranged in a rectangular array and suspended typically by wires 84 some distance below an overlying structure, not shown. A plurality of square and rectangular panels 86, usually of sound absorbing material, rest upon the rails 82 to form a decorative ceiling. Such a suspended ceiling is typically used in commercial structures to conceal overhead air handling conduits, sprinkler system conduits and other piping, cable, etc.

In accordance with the present invention, an ozone generator apparatus 80 is provided which is adapted to be substituted for one of the panels 86. The ozone generating apparatus 80 includes a generally rectilinear housing 88 including a closed top 90 and four side walls 92 depending from the top and terminating in a co-planar lower edge 94. The lower edge 94 of all four side walls 92 are sized to be supported on the rails 82 of the gridwork forming the suspended ceiling. A porous lower panel 96, shown in FIG. 7, is adapted to permit air flow therethrough and closes the otherwise open bottom of the apparatus 80. A fan motor and fan 98 are positioned centrally within the housing 88 for causing a circulation of air through the lower panel 96. An ozone generating means 100 preferably enclosed within a second housing 102 is fixed near one corner of the housing 88 such that air circulated by the fan 98 entering through the porous grid 96 at the corners of the apparatus 80 passes through the ozone generating means 100 to be mixed with other air entering other corners of the apparatus. The electrical circuit 104 required for the development of potentials necessary for the generation of the ozone by the ozone generating means 100 is fixed to housing 88 and control panel 106 containing control means coupled to the fan motor 98 and ozone generating means 100 positions the controls so as to be able to be manipulated through the plane of the porous lower panel 96.

To provide for safety in the installation, a safety wire 108 connected to overhead structure in a manner similar to wires 84 is coupled to the hat shaped channel 110 included in the closed top wall 90 of housing 88. An added housing 112 contains means 114 for coupling the electronic circuitry 104 and controls 106 to an outside source of power.

The ozone generating means 100 is substantially identical to that provided within the first enclosure 24 shown in FIG. 4. It will be appreciated the number of ozone generating plates 26 is preferably reduced in a one room installation over that which would normally be employed to service an entire house or building as discussed in connection with the first disclosed embodiment.

Although the invention has been described in detail with reference to the illustrated and preferred embodiments, variations and modifications exist within the scope and spirit of the invention as described and as defined in the following claims.

What is claimed is:

1. An ozone generation apparatus adapted for installation into central air handling system for buildings comprising:
   a first housing containing a plurality of ozone generating plates, the first housing having a first pair of opposed walls including openings therein to permit air flow there through adjacent to the plurality of ozone generating plates, a second pair of opposed walls orthogonally situated with respect to the first pair of walls, and including support means for supporting the plurality of ozone generating plates at a fixed location within the housing, the support means including means for electrically contacting selected portions of the ozone generating plates,
   a second housing containing circuit means for developing an electrical potential for application to the ozone generating plates, the second housing having a front surface including control means for controlling the circuit means and a back surface adapted to be situated contiguously to an outside surface of an air handling conduit of a central air handling system, the back surface including a perimeteral flange for securing the second housing to the air handling conduit, and
   coupling means for selectively coupling the first housing to the back surface of the second housing in at least two different relative orientations to permit adaptation of the ozone generation apparatus to the relative direction of air flow through the air handling conduit, the first housing being confined within a perimeter defined by the perimeteral flange and projecting rearwardly from the back surface of the second housing for projection through an opening in the air handling conduit to a position wholly within the air handling conduit.

2. The apparatus of claim 1 wherein each of the plurality of ozone generating plates comprises a generally rectilinear ceramic substrate supported along at least one edge by said support means, and metallic ozone emitter grids bonded to opposite sides of the ceramic substrate and contacted by said electrical contacting means.

3. The apparatus of claim 1 wherein the first housing further comprises an end wall unitarily joining the first pair of opposed walls.

4. The apparatus of claim 3 wherein the end wall and first pair of opposed walls consist essentially of a U-shaped strip of expanded metal.

5. The apparatus of claim 1 wherein said support means consists essentially of an ozone resistant PVC element including slot means for receiving an edge of said ozone generating plates.

6. The apparatus of claim 1 wherein the first housing is vertically offset with respect to the second housing to provide a troque about a lower edge of the first housing for biasing the ozone generating apparatus into engagement with the air handling conduit.

7. The apparatus of claim 1 wherein said flange includes seal means on said back surface for sealingly engaging an edge of said opening in the air handling conduit.

8. The apparatus of claim 1 further comprising a third housing fixed to a bottom panel of said second housing and containing means for coupling said circuit means to a source of power.

9. The apparatus of claim 8 wherein said source of power is controlled by said central air handling system.

10. An ozone generation apparatus for installation into a suspended ceiling system of a building, the apparatus comprising:
    a generally rectilinear housing having a closed top, four side walls depending from the top and terminating in a coplanar lower edge defining an open bottom, the lower edge being sized to be supported upon rails forming a grid work of a conventional suspended ceiling, a porous lower panel closing the open bottom and adapted for air flow therethrough, a fan motor and fan mounted within the housing for causing a circulation of air through the lower panel, ozone generating means mounted within the housing in the air circulation path for introducing ozone therein, and control means coupled to the fan motor and ozone generating means for control thereof.

11. The apparatus of claim 10 wherein the closed top of the housing includes a upwardly projecting channel and means for coupling the top of the housing to a safety wire suspended from a structural element of said building.

12. The apparatus of claim 10 further comprising a control panel fixed to one of said side walls adjacent said lower edge, and manually adjustable control elements mounted on the control panel for access through the plane of the porous lower panel.

13. The apparatus of claim 10 wherein the ozone generating means comprises a second housing mounted within the first housing, the second housing containing a plurality of ozone generating plates and having a first pair of opposed walls including openings therein to permit air flow there through adjacent to the plurality of ozone generating plates, a second pair of opposed walls orthogonally situated with respect to the first pair of walls, and including support means for supporting the plurality of ozone generating plates at a fixed location within the second housing, the support means including means for electrically contacting selected portions of the ozone generating plates.

14. The apparatus of claim 13 wherein each of the plurality of ozone generating plates comprises a generally rectilinear ceramic substrate supported along at least one edge by said support means, and metallic ozone emitter grids bonded to opposite sides of the ceramic substrate and contacted by said electrical contacting means.

15. The apparatus of claim 14 wherein said support means consists essentially of an ozone resistant PVC element including slot means for receiving an edge of said ozone generating plates.

16. The apparatus of claim 1 further comprising a third housing fixed to an inside surface of one of said side walls and containing means for coupling said control means to a source of power.

* * * * *